US005328183A

United States Patent [19]

Counts

[11] Patent Number: 5,328,183

[45] Date of Patent: Jul. 12, 1994

[54] FOLDING WHEELCHAIR FRAME

[75] Inventor: David M. Counts, Fresno, Calif.

[73] Assignee: Quickie Designs Inc., Fresno, Calif.

[21] Appl. No.: 972,128

[22] Filed: Nov. 5, 1992

[51] Int. Cl.[5] .......... B62M 1/14

[52] U.S. Cl. .......... 280/42; 280/250.1; 280/650; 297/42; 297/DIG. 4

[58] Field of Search .......... 297/42, DIG. 4; 280/250.1, 42, 647, 650, 304.1, 47.38

[56] References Cited

U.S. PATENT DOCUMENTS

| | | | |
|---|---|---|---|
| 3,968,991 | 7/1976 | Maclaren | 297/42 X |
| 4,025,088 | 5/1977 | Rothschild | 280/42 X |
| 4,371,183 | 2/1983 | Dion | 280/250.1 X |
| 4,768,797 | 9/1988 | Friedrich | 280/42 X |
| 4,790,553 | 12/1988 | Okamoto | 280/250.1 |
| 4,824,132 | 4/1989 | Moore | 280/250.1 X |
| 4,840,390 | 6/1989 | Lockard et al. | 280/250.1 |
| 4,861,056 | 8/1989 | Duffy, Jr. et al. | 280/250.1 |
| 4,960,287 | 10/1990 | Lautzenhiser et al. | 280/250.1 X |
| 5,154,438 | 10/1992 | Barclay | 280/250.1 |

*Primary Examiner*—Margaret A. Focarino
*Assistant Examiner*—Michael Mar
*Attorney, Agent, or Firm*—Flehr, Hohbach, Test, Albritton & Herbert

[57] ABSTRACT

A foldable frame (10) for a lightweight wheelchair (8) is disclosed. The foldable wheelchair frame (10) includes a pair of side frame assemblies (12, 14) each having a substantially horizontally oriented upper side frame member (16) extending for directly supporting a seat assembly (20). A cross bracing assembly (38) is mounted between the side frame assemblies (12, 14) for movement of the side frame assemblies (12, 14) between a deployed position and a collapsed position. The cross bracing assembly (38) includes a pair of cross bracing members (40, 42) pivotally coupled to each other by a pivot (44). The cross bracing members (40, 42) are pivotably coupled to the side frame assemblies (12, 14) by coupling proximate upper ends to the upper side frame members (16) and proximate lower ends to a remainder of the side frame assemblies (12, 14). At least one of the cross bracing members (40, 42) is formed for cooperative interengagement with one of the upper side frame members (16) and a pivot assembly (46) to secure the cross bracing members (40, 42) in a weight supporting position in the deployed condition.

24 Claims, 2 Drawing Sheets

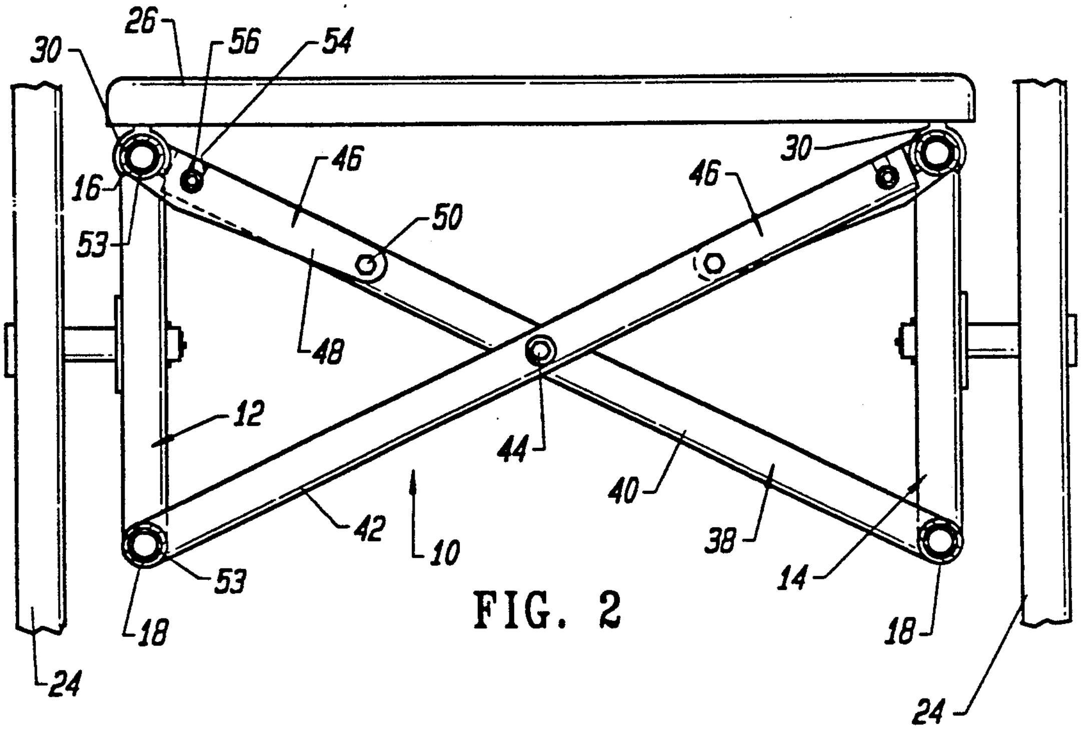
FIG. 2
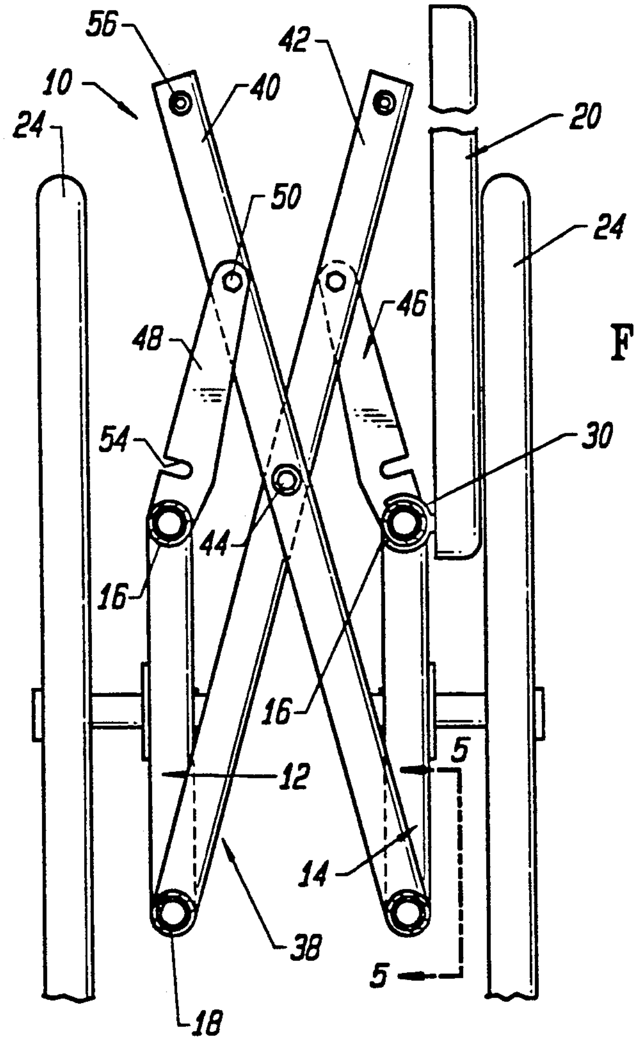
FIG. 4
FIG. 5
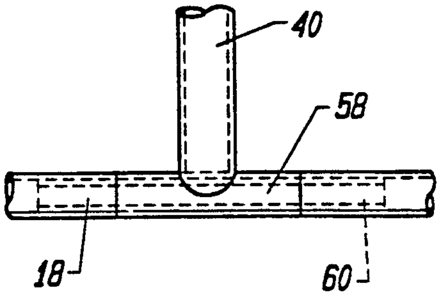

FOLDING WHEELCHAIR FRAME

TECHNICAL FIELD

The present invention relates generally to a wheelchair frame, and more particularly to a foldable frame for a lightweight wheelchair.

BACKGROUND ART

Portable wheelchairs are becoming an increasingly popular alternative over the standard rigid models for wheelchair riders. The portable wheelchairs generally have a frame which folds or collapses for easy transportation, enabling a user to conveniently travel between various locations, such as from home to work, school, restaurants, the theater or any other site of interest. Typically, the portable wheelchairs are light in weight for improved maneuverability and handling. The frame is often formed from a tubular material, such as a lightweight, high-strength aircraft-grade aluminum tubing, to reduce the overall chair weight while providing the necessary strength. In efforts to further reduce the weight of the chair, the number of components comprising the chair frame has also been reduced.

The portable wheelchairs available in the art typically include opposed side frame assemblies having upper and lower horizontally extending bars and a pair of cross braces pivoted for movement about the lower frame bars. The opposite ends of each of the cross braces are pivotably mounted to a horizontally extending seat frame rod. A flexible seat is suspended between the laterally spaced seat frame rods. When the wheelchair is deployed, the seat frame is supported on brackets carried by the upper bars of the opposed side frames. The seat frame is held by the brackets in a superimposed position above the side frame assemblies. The wheelchair frame is folded or collapsed for transport by pivoting the cross braces about the respective side frame bars, raising the seat frame and drawing the opposed side frame assemblies towards one another.

With one type of folding wheelchair, the support brackets have a shallow groove formed to receive the seat frame rod. The seat frame is supported by the bracket during use, with the frame rod held within the groove by the weight of the seat assembly. Once the user vacates the chair, the wheelchair is easily folded for transport or storage by lifting the frame rods from the grooved brackets and moving the side frame assemblies towards one another. During operation, the user's weight often tends to urge the seat frame assembly off of the support bracket. When traveling over bumps or rough terrain, for example, the seat frame assembly will be lifted slightly from the support brackets, partially folding or collapsing the wheelchair. Thus, under certain operating conditions the wheelchair produces a sense of instability, resulting in user discomfort.

Other available wheelchairs include brackets or other means formed for supporting and retaining the seat frame in a stable superimposed position above the side frame assemblies. U.S. Pat. No. 4,790,553 discloses a wheelchair in which a support or mounting block is provided for carrying the seat frame assembly. The mounting block is formed with a cylindrical recess having a circumference extending beyond 180 degrees to provide a detent for retaining the seat frame rod. When the wheelchair frame is deployed, the seat frame rod is held in place by the opposed edges bordering the recess. As the wheelchair is folded or opened, the space between the opposed edges is resiliently enlarged to allow passage of the seat frame rod without requiring the application of excessive force. The mounting block of the disclosed wheelchair is formed for retaining the seat frame assembly above the opposed side frames during operation and for conveniently releasing the seat frame when folding or collapsing the wheelchair.

The side frame assemblies, the seat frame and the cross braces of the portable wheelchairs available in the art cooperate to provide a collapsible frame which may be conveniently deployed. The cross braces are pivotably mounted at opposite ends to the side frame assemblies and the seat frame. During operation, the support blocks distribute forces applied during operation between the side frame assemblies, cross braces and the seat frame. The operational forces imparted on the wheelchair during use may induce structural fatigue of the support brackets, eventually resulting in part failure. As the bracket or mount wears, the seat frame will not be adequately supported in a superimposed position above the side frame assemblies. Moreover, the support brackets will no longer evenly distribute the forces of operation, placing other components of the wheelchair frame under stress and potentially damaging the wheelchair.

Providing a folding wheelchair frame having a pair of cross bracing members pivotably coupled to the side frame assemblies would eliminate the need for a seat frame assembly and the required support brackets or blocks. The operational forces would be evenly distributed between the side frame assemblies and the cross braces, with the seat being supported directly by the opposed side frame assemblies. Allowing the seat to rest directly on the opposed side frames would substantially increase the structural life of the frame by reducing the stresses exerted on the various components of the wheelchair.

With the wheelchairs known in the prior art, the seat is suspended by the seat frame, which is in turn supported by the side frame assembly via the support brackets. Eliminating the seat frame assembly enables the seat to be supported directly by the opposed side frames. The effective height of the seat is thereby lowered, providing a stable ride similar to that offered by a rigid-type wheelchair frame. The wheelchair is lighter in weight without the seat frame assembly. Moreover, reducing the number of components substantially decreases the costs of manufacture and maintenance.

When the folding wheelchairs of the prior art are collapsed, the seat frame rods are vertically raised relative to the upper side frame bars. The raised seat frame assembly makes the collapsed wheelchair somewhat cumbersome. Eliminating the seat frame assembly enhances the portability of the folded wheelchair by reducing the number of components which must be accommodated when the frame is collapsed.

Accordingly, a foldable frame for a wheelchair including opposed side frames assemblies and cross bracing members pivotably coupled to the side frame assemblies is highly desirable. A wheelchair frame in which at least one of the cross braces interengages with one of the side frame assemblies to secure the cross bracing members in a weight-supporting condition when the frame is deployed is similarly desirable. A portable wheelchair frame providing the stability of a rigid-type wheelchair is also desirable. A wheelchair frame which is lightweight, compact, and which may be efficiently manufactured would be particularly useful. A foldable frame for a wheelchair which may be conveniently collapsed and transported would also be useful.

A primary object of the present invention, therefore, is to provide a foldable frame for a wheelchair having a cross bracing assembly pivotably coupled to the side frame assemblies for movement of the side frame assemblies between a deployed position and a collapsed position.

A further object of the present invention is to provide a foldable frame for a wheelchair having a pair of cross bracing members, with at least one of the cross bracing members secured in a weight-supporting condition when the wheelchair is deployed.

Another object of the present invention is to provide a foldable frame for a wheelchair in which the cross braces and the side frame assemblies are pivotably coupled together when the wheelchair frame is deployed.

Yet another object of the present invention is to provide a foldable frame for a wheelchair which provides the stability of a rigid wheelchair frame.

An additional object of the present invention is to provide a foldable frame for a wheelchair which is lightweight.

A more general object of the present invention is to provide a foldable frame for a wheelchair which is compact, and which may be efficiently manufactured and maintained.

The foldable wheelchair frame of the present invention has other objects and features of advantage which will become apparent from and are set forth in more detail in the description of the Best Mode for Carrying Out the Invention and the accompanying drawings.

DISCLOSURE OF THE INVENTION

The foldable wheelchair of the present invention includes a pair of side frame assemblies each having a substantially horizontally oriented upper side frame member. When deployed for use, the upper side frame members directly support the seat of the wheelchair. A scissors-type cross bracing assembly is mounted between the opposed side frame assemblies, moving the side frames between a deployed position and a collapsed position. The cross bracing assembly includes a pair of cross bracing members pivotably coupled together by a pivot provided intermediate the opposite ends of the members. The cross bracing members are each coupled near their upper ends to one of the upper side frame members, and towards their lower ends to the remainder of the side frame assemblies. At least one of the cross bracing members is formed for cooperative interengagement with one of the upper side frame members and a frame pivot device, which secures the cross bracing members in a weight-supporting condition. The interengagement between the cross bracing member, upper side frame member and frame pivot device allow the seat to be supported directly on top of the upper side frame members.

BRIEF DESCRIPTION OF THE DRAWINGS

FIG. 2 is a front sectional view of the foldable frame of FIG. 1, shown in the deployed position.

FIG. 4 is a front sectional view of the foldable frame of FIG. 1, shown in the collapsed position.

FIG. 5 is an enlarged, fragmentary side elevational view substantially taken along the plane of line 5—5 in FIG. 4.

BEST MODE OF CARRYING OUT THE INVENTION

Figure 1:
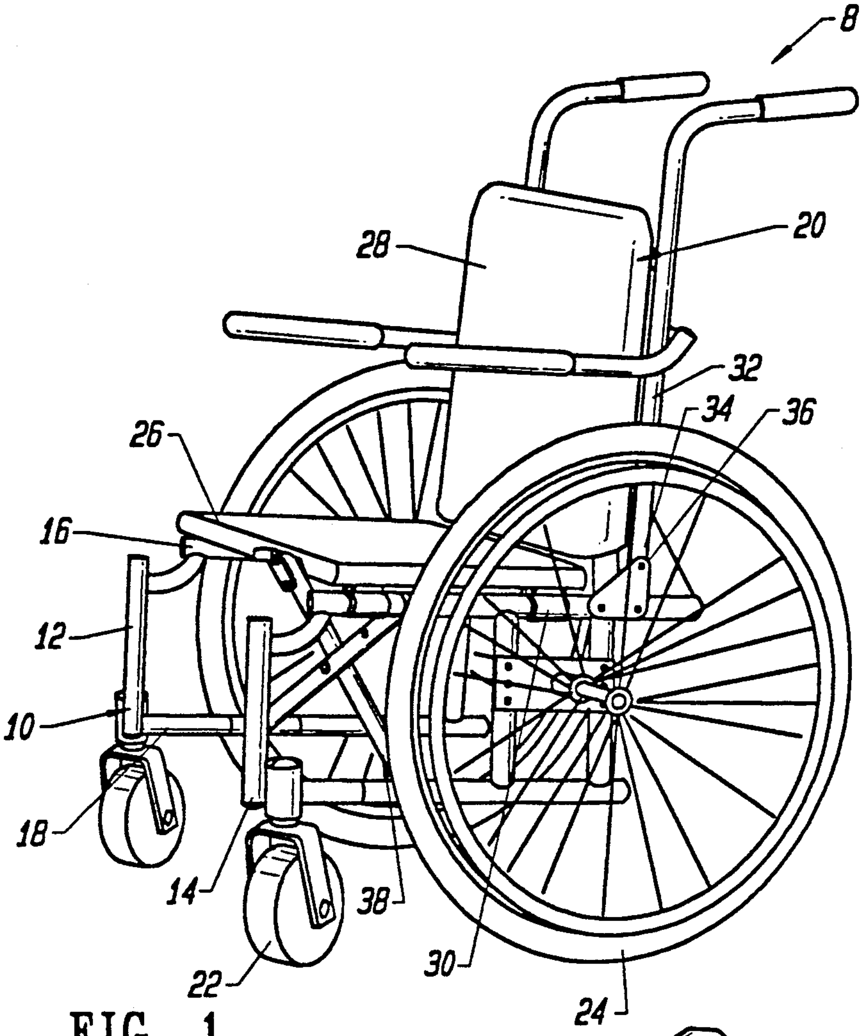
FIG. 1 is a perspective view of a wheelchair having a foldable frame in accordance with the present invention, shown in the deployed position.
Figure 3:
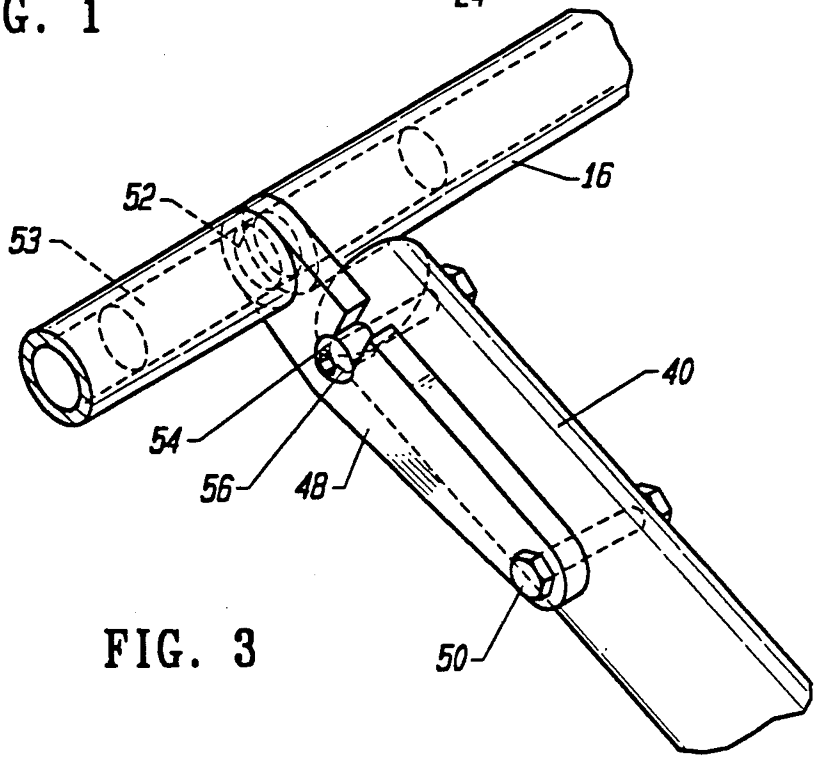
FIG. 3 is an enlarged, fragmentary perspective view of an upper side frame member and cross bracing member of the foldable frame of FIG. 1, shown in the deployed position.

Reference will now be made in detail to the preferred embodiments of the invention, which are illustrated in the accompanying Figures. Turning now to the drawings, wherein like components are designated by like reference numerals throughout the various figures, attention is directed to FIGS. 1 and 2.

A lightweight, portable wheelchair 8 having a foldable frame 10 which is designed in accordance with the present invention is shown in FIG. 1. The foldable frame 10 includes a pair of laterally spaced side frame assemblies 12 and 14, each having first and second side frame members 16 and 18. The vertically spaced side frame members 16 and 18 have a generally horizontal orientation, with the upper side frame member 16 positioned for supporting a seat assembly 20. Caster wheels 22 and rear wheels 24, which are preferably of the type found in traditional lightweight wheelchairs, are mounted to each of the opposed side frame assemblies. When the frame 10 is collapsed, the side frame assemblies 12 and 14 and the attached wheels are moved inwardly, bringing the wheelchair 8 into a compact configuration for convenient transport and storage.

In the present embodiment, seat assembly 20 includes a solid seat and backrest 26 and 28 offering enhanced comfort and support for the user. A number of resilient clamps 30 provided underneath the seat 26 secure the seat assembly 20 directly to the upper side frame members 16. When collapsing the wheelchair 8, the seat assembly may be easily removed by disengaging the clamps 30 from one of the upper frame members 16 and pivoting the chair to a substantially vertically upright position. Alternatively, the seat assembly 20 may be completely removed from the wheelchair by pulling the seat 26 from the side frame assemblies 12 and 14 and disengaging the clamps 30 from the upper frame members 16. A back frame member 32 is pivotably mounted to each of the upper frame members 16 by a latch assembly 34 which includes a pivot pin 36. Once the latch is released, the back frame member 32 is pivoted from a generally upright position towards upper frame member 16 in a plane parallel to the side frame assembly 12. With the detachable seat assembly 20, the pivotably mounted back frame 32 and the foldable frame 10, the lightweight wheelchair 8 may be easily collapsed for conveniently transporting and storing the chair.

Turning particular to FIGS. 2-5, the foldable frame 10 of the present invention will be discussed in greater detail. The frame 10 also includes a scissors-type cross bracing assembly 38 mounted between the side frames 12 and 14. The cross bracing assembly 38 includes a pair of cross bracing members 40 and 42 which are coupled together by cross bracing pivot means, such as a pivot pin 44, for movement of the frame assemblies 12 and 14 between a deployed position (FIG. 2) and a collapsed position (FIG. 4). When the frame is deployed, the distal ends of the cross braces 40 and 42 are held in a position inside and below the upper side frame member of the side frames 12 and 14. The seat 26 may therefore be positioned directly above the upper frame members 16, lowering the relative elevation of the seat. The center of gravity of the wheelchair is similarly lowered, enhancing the stability of the chair.

In the present embodiment, the cross braces 40 and 42 are each pivotably coupled to both of the side frames 12 and 14. The cross bracing members are joined to the upper frame members 16 of side frames 12 and 14 respectively by frame pivot means or pivot assembly 46. One such pivot means is provided by a link 48 pivotably mounted to each of the cross braces and the corresponding upper side frame member 16. Link 48 is formed for interengagement with the cross brace to secure the cross bracing assembly 38 in a stable, weight-supporting condition. As is shown particularly in FIGS. 2 and 3, the link 48 is dimensioned and positioned to retain the distal end of the cross braces 40 and 42 inside and below the upper frame member 16 when the frame 10 is deployed. When the cross braces 40 and 42 are pivoted towards the vertical axis to collapse the frame 10, the link 48 extends between the cross braces and the upper side frame member, connecting the two together.

The link 48 will be discussed in greater detail in relation to cross bracing member 40. Since cross brace 42 is similar to, and reversed relative to cross brace 42, it is to be understood that the discussion applies equally to cross brace 42. As is shown particularly in FIGS. 2 and 3, one end of the link 48 is coupled to cross brace 40 by a pivot 50. The pivot 50 is spaced from the distal end of the cross brace such that when the frame 10 is deployed, the link 48 extends in a direction parallel to the cross brace 40. The opposite end of the link is formed with an aperture 52, and is pivotably mounted to an inner shaft 53 carried by the upper side frame member 16. The link is pivotable about its opposed ends, enabling the upper ends of the cross braces to be raised and lowered as bracing assembly 38 is collapsed and expanded when folding or deploying the wheelchair.

The cross bracing pivot means or pivot assembly 46 further includes shoulder means releasably securing the cross bracing assembly in a stable, load-bearing configuration. In the present embodiment, the shoulder means is provided in part by an upward opening slot 54. A pin 56 mounted to the cross bracing member 40 is positioned and dimensioned for insertion into the pin engagement slot 54. The pin 56 is moved into the slot 54 when the frame 10 is deployed. When interengaged, the pin 56 and slot 54 prevent partial collapse of the frame 10 during wheelchair operation. The pin 56 is removed from slot 54 by pivoting the cross brace 40 towards a vertical axis, drawing the opposed frame assemblies 12 and 14 and attached wheels 22 and 24 towards one another. When folding the wheelchair, the wheels and side frame assemblies 12 and 14 are moved in a direction perpendicular to the direction of travel. This substantially reduces the likelihood of the wheelchair partially collapsing during operation. The pin and slot will remain interengaged together until the wheelchair is intentionally folded for transport or storage. The frame 10 will therefore safely support the weight of a person using the wheelchair.

In the present embodiment, the pin 56 is mounted adjacent the distal end of the cross bracing member, while the pin engagement slot 54 is positioned towards the upper side frame member 16. This configuration provides increased stability; however, changing the location of the pin and the pin engagement slot is within the scope of the present invention. The orientation of the slot 54 in the present embodiment provides additional protection against inadvertent folding of the frame 10. When the cross bracing assembly 38 is in a deployed position, the opening of slot 54 is oriented at an angle relative to the vertical axis. Instead of urging pin 56 out of the slot, any upwardly-directed forces applied during operation will press the pin against the wall of the slot. The pin 56 will therefore not become disengaged during operation, even when traveling over rough terrain.

The link 48 of the present invention provides a means of pivotably coupling the cross braces 40 and 42 and the side frames 12 and 14 together. However, the link 48 may be replaced by other cross bracing pivot means for pivotably coupling the two members together. Similarly, the pin 56 and pin engagement slot 54 may be replaced by other known means for securing the upper ends of the cross bracing members directly to the upper frame members 16 of the side frames.

Each of the cross braces 40 and 42 are also pivotably mounted to side frame member 18 of one of the side frames 12 and 14 respectively. The pivotable coupling of the cross bracing assembly 38 to both the upper and lower side frame members 16 and 18 allows the bracing assembly 38 to be collapsed, drawing the opposed side frames 12 and 14 inwardly toward one another. As is shown particularly in FIG. 5, the lower ends of the cross bracing members are provided with a hollow tube 58 which is pivotably mounted to an inner shaft 60 carried by the lower side frame member 18. As the cross braces 40 and 42 are pivoted about pivot 44, the tube 58 pivots about the shaft 60 allowing the frame 10 to be conveniently collapsed and deployed.

As is shown particularly in FIG. 2, when the frame 10 is deployed the opposed ends of the cross bracing members 40 and 42 are secured directly to the vertically spaced side frame members 16 and 18. With this configuration, the forces exerted on the frame 10 during operation of the wheelchair are evenly applied to the side frames and cross bracing assembly. By coupling the upper ends of the cross braces directly to the side frame members instead of mounting them to a second, horizontally extending frame member, the foldable frame of the present invention is provided with a more proportional force distribution. Since the seat 26 is supported on the upper side frame members 16, any forces exerted on the seat during operation are transferred directly to the frame 10. Mounting the seat 26 directly to the side frame assemblies 12 and 14 reduces the number of frame components and the weight of the wheelchair. In addition, the cost of manufacture is substantially reduced. The components of the foldable frame 10 are therefore less subject to wear-inducing stresses and strains. Thus, the foldable frame of the present invention offers the advantages of reduced maintenance and longer component life.

What is claimed is:

1. A foldable frame for a lightweight wheelchair comprising:

(a) a pair of side frame assemblies each having a substantially horizontally oriented upper side frame member extending for attachment of a seat assembly directly thereto; and (b) a scissors-type cross bracing assembly mounted between said side frame assemblies for movement of said side frame assemblies between a deployed position and a collapsed position, said cross bracing assembly including a pair of cross bracing members pivotally coupled to each other intermediate opposite ends of said cross bracing members by cross bracing pivot means, and said cross bracing members each being pivotally coupled proximate upper ends thereof by a frame pivot assembly to the upper side frame members for vertical displacement of said upper ends relative to the upper side frame members and each being pivotally coupled proximate lower ends thereof to a remainder of said side frame assemblies, and at least one of said cross bracing members being formed for cooperative interengagement with one of: (i) an upper member of said side frame assemblies and (ii) a frame pivot assembly to secure said cross bracing members in a weight-supporting condition in said deployed position.

2. The foldable frame as defined in claim 1 wherein, said frame pivot assembly and at least one of said cross bracing members are formed to releasably couple a distal end of the cross bracing member and said frame pivot assembly together to secure and stabilize said frame in said deployed position.

3. The foldable frame as defined in claim 2 wherein, each of said cross bracing members is formed for cooperative interengagement with a frame pivot assembly to secure both said cross bracing members in a weight-supporting condition and each of said cross bracing members is formed to releasably couple a distal end of a cross bracing member and said frame pivot assembly together to stabilize said frame.

4. The foldable frame as defined in claim 3 wherein, said frame pivot assembly coupling each of said cross bracing members to said upper side frame members cooperatively engages the coupled cross bracing member.

5. The foldable frame of claim 1 wherein, said frame pivot assembly interengaging with one of said cross bracing members includes a link pivotally coupled to said one of said cross bracing members and pivotally coupled to one of said side frame assemblies, said link being formed to pivot into interengagement with a portion of said one of said cross bracing members in said deployed position.

6. The foldable frame of claim 5, and a pin carried by one of said link and said one of said cross bracing members, and a pin engagement slot opening to a side of the other of said link and said one of said cross bracing members, said pin engagement slot being positioned to receive said pin to secure said one of said cross bracing members in said deployed position.

7. The foldable frame of claim 6 wherein, said pin is mounted to said one of said cross bracing members, and said pin engagement slot is formed in said link.

8. The foldable frame of claim 7 wherein, said pin is mounted to said one of said cross bracing members proximate a distal end thereof; and said pin engagement slot is formed in said link proximate a position of pivotal coupling of said link to said one of said side frame assemblies.

9. The foldable frame of claim 8 wherein, said link is pivotally coupled to said one of said cross bracing members at a position intermediate said cross bracing pivot means and said pin, and said pin and said pin engagement slot being positioned closer to said pivotal coupling of said link to said one of said side frame assemblies than to said pivotal coupling of said link to said one of said cross bracing members.

10. The foldable frame of claim 8 wherein, said one of said cross bracing members has a length between said cross bracing pivot means and said distal end enabling said one of said cross bracing members to be pivoted to position said distal end inside and below the upper side frame member of said one of said side frame assembly.

11. The foldable frame of claim 1 wherein, each of said cross bracing members is pivotably mounted to each of said side frame assemblies proximate upper ends of said cross bracing members by a frame pivot assembly including a link member having a slot opening to an upwardly facing side thereof, each of the link members being pivoted proximate one end to one of said side frame assemblies and being pivoted proximate an opposite end to one of said cross bracing members, said frame pivot assembly further including a pin carried by each of said cross bracing members proximate upper ends thereof and positioned and dimensioned for movement into said slot from a side of said link member to produce said interengagement.

12. The foldable frame of claim 1, and a removable seat member mounted directly on said upper side frame member of said side frame assemblies.

13. The foldable frame for a lightweight wheelchair comprising:

(a) a pair of cross bracing members pivotally coupled together proximate mid-portions thereof for movement between a deployed position and a collapsed position, said cross bracing members each having an upper end and an opposed lower end;

(b) a pair of laterally spaced side frame assemblies each having a horizontally extending first side frame member positioned for attachment of a seat assembly thereto and a vertically spaced and horizontally extending second side frame member;

(c) said upper end of each of said cross bracing members being mounted by a pivot assembly to the first side frame members for vertical displacement of said upper end relative to said first side frame member and said lower end of each of said cross bracing members being pivotally mounted to the second side frame members; and (d) each said pivot assembly being further formed for interengagement with one of said cross bracing members to secure the cross bracing member in said deployed position with said pivot assembly supporting said cross bracing member in a stable condition for loading of said frame when said frame is deployed.

14. The foldable frame of claim 13, wherein, said pivot assembly includes a link member extending between and pivotally mounted to one of said side frame assemblies and pivotally mounted to one of said cross bracing members to couple said one of said side frame assemblies and said one of said cross bracing members together.

15. The foldable frame of claim 14 wherein, said link member is pivotably mounted to said first side frame member of said one of said side frame assemblies.

16. The foldable frame of claim 14 wherein, said cross bracing members each include shoulder means provided on said cross bracing members to releasably retain said one of said cross bracing members in said deployed position.

17. The foldable frame of claim 16 wherein, said shoulder means is provided by a pin carried by said one of said cross bracing members and extending outwardly therefrom in a direction to said link member; and a pin engagement slot formed in and extending to open to one side of said link member.

18. The foldable frame of claim 13, and a back frame member pivotally mounted to each of said side frame assemblies for pivotal movement in a plane parallel to said side frame assemblies; and latch means formed to releasably latch each of the back frame members in a near vertical orientation.

19. A foldable frame for a lightweight wheelchair comprising:

(a) a pair of side frame assemblies each having a substantially horizontally oriented upper side frame member;

(b) a seat directly mounted on and extending between said upper said frame members; and (c) a scissors-type cross bracing assembly mounted between said side frame assemblies for movement of said side frame assemblies between a deployed position and a collapsed position, said cross bracing assembly including a pair of cross bracing members pivotally coupled to each other intermediate opposite ends of said cross bracing members by cross bracing pivot means, and said cross bracing members being pivotally coupled proximate upper ends thereof by a frame pivot assembly to the upper side frame members and pivotally coupled proximate lower ends thereof to a remainder of said side frame assemblies, and at least one of said cross bracing members being formed for cooperative interengagement with one of: (i) said upper side frame members, and (ii) said frame pivot assembly to secure said cross bracing members in a weight-supporting condition in said deployed position with a longitudinal axis of said one of said cross bracing members intersecting a longitudinal axis of said upper side frame member, said frame pivot assembly being formed for displacement of the upper end of the cross bracing member relative to said upper side frame member.

20. A foldable frame for a lightweight wheelchair comprising:

(a) a pair of side frame assemblies each having a substantially horizontally oriented upper side frame member extending for attachment of a seat assembly directly thereto; and (b) a scissors-type cross bracing assembly mounted between said side frame assemblies for movement of said side frame assemblies between a deployed position and a collapsed position, said cross bracing assembly including a pair of cross bracing members pivotally coupled to each other intermediate opposite ends of said cross bracing members by cross bracing pivot means, and said cross bracing members being pivotally coupled proximate upper ends thereof by a frame pivot assembly to the upper side frame members and each being pivotally coupled proximate lower ends thereof to a remainder of said side frame assemblies, and at least one of said cross bracing members being formed for cooperative interengagement with one of: (i) said upper side frame members, and (ii) said frame pivot assembly to secure said cross bracing members in a weight-supporting condition in said deployed position, side frame pivot assembly and at least one of said cross bracing members being formed to releasably couple a distal end of the cross bracing member and said frame pivot assembly together to secure and stabilize said frame in said deployed position.

21. The foldable frame as defined in claim 20 wherein, each of said cross bracing members is formed for cooperative interengagement with a frame pivot assembly to secure both said cross bracing members in a weight-supporting condition and each of said cross bracing members is formed to releasably couple a distal end of a cross bracing member and said frame pivot assembly together to stabilize said frame.

22. A foldable frame for a lightweight wheelchair comprising:

(a) a pair of side frame assemblies each having a substantially horizontally oriented upper side frame member extending for attachment of a seat assembly directly thereto; and (b) a scissors-type cross bracing assembly mounted between said side frame assemblies for movement of said side frame assemblies between a deployed position and a collapsed position, said cross bracing assembly including a pair of cross bracing members pivotally coupled to each other intermediate opposite ends of said cross bracing members by cross bracing pivot means, and said cross bracing members being pivotally coupled proximate upper ends thereof by a frame pivot assembly to the upper side frame members and each being pivotally coupled proximate lower ends thereof to a remainder of said side frame assemblies, and at least one of said cross bracing members being formed for cooperative interengagement with one of: (i) said upper side frame members and (ii) said frame pivot assembly to secure said cross bracing members in a weight-supporting condition in said deployed position, side frame pivot means interengaging with one of said cross bracing members including a link pivotally coupled to said one of said cross bracing members and pivotally coupled to one of said side frame assemblies, said link being formed to pivot into interengagement with a portion of said one of said cross bracing members in said deployed position.

23. The foldable frame of claim 22, and a pin carried by one of said link and said one of said cross bracing members, and a pin engagement slot opening to a side of the other of said link and said one of said cross bracing members, said pin engagement slot being positioned to receive said pin to secure said one of said cross bracing members in said deployed position.

24. A foldable frame for a lightweight wheelchair comprising:

(a) a pair of side frame assemblies each having a substantially horizontally oriented upper side frame member extending for attachment of a seat assembly directly thereto; and (b) a scissors-type cross bracing assembly mounted between said side frame assemblies for movement of said side frame assemblies between a deployed position and a collapsed position, said cross bracing assembly including a pair of cross bracing members pivotally coupled to each other intermediate opposite ends of said cross bracing members by cross bracing pivot means, and said cross bracing members being pivotally coupled proximate upper ends thereof by a frame pivot assembly to the upper side frame members and each being pivotally coupled proximate lower ends thereof to a remainder of said side frame assemblies, and at least one of said cross bracing members being formed for cooperative interengagement with one of: (i) said upper side frame member and (ii) said frame pivot assembly to secure said cross bracing members in a weight-supporting condition in said deployed position, said frame pivot assembly including a link member having a slot opening to an upwardly facing side thereof, each of the link members being pivoted proximate one end to one of said side frame assemblies and being pivoted proximate an opposite end to one of said cross bracing members, said frame pivot assembly further including a pin carried by each of said cross bracing members proximate upper ends thereof and positioned and dimensioned for movement into said slot from a side of said link member to produce said interengagement.

* * * * *